United States Patent
Apte et al.

(10) Patent No.: US 12,499,061 B2
(45) Date of Patent: Dec. 16, 2025

(54) SYSTEMS AND METHODS FOR FACILITATING DUAL OWNERSHIP OF CACHE REGIONS

(71) Applicant: Advanced Micro Devices, Inc., Santa Clara, CA (US)

(72) Inventors: Amit P. Apte, Austin, TX (US); Ganesh Balakrishnan, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 52 days.

(21) Appl. No.: 18/091,196

(22) Filed: Dec. 29, 2022

(65) Prior Publication Data

US 2025/0245172 A1 Jul. 31, 2025

(51) Int. Cl.
G06F 12/14 (2006.01)
G06F 12/0811 (2016.01)
G06F 12/084 (2016.01)

(52) U.S. Cl.
CPC ...... G06F 12/1491 (2013.01); G06F 12/0811 (2013.01); G06F 12/084 (2013.01); G06F 2212/621 (2013.01)

(58) Field of Classification Search
CPC ............. G06F 12/0811; G06F 12/0815; G06F 12/0817; G06F 12/084; G06F 12/1491; G06F 2212/621
See application file for complete search history.

(56) References Cited

U.S. PATENT DOCUMENTS

| 5,634,110 A * | 5/1997 | Laudon ............... G06F 12/0826 711/147 |
| 2004/0059877 A1 | 3/2004 | Brown et al. |
| 2008/0104333 A1 | 5/2008 | Veazey |
| 2009/0240891 A1 | 9/2009 | Strait et al. |

(Continued)

OTHER PUBLICATIONS

A 2020 Tableau® by Salesforce® online public disclosure published on tableau.com titled "Split a Field into Multiple Fields"; Published on or before Nov. 12, 2020; Accessed by examiner via Wayback Machine on Mar. 30, 2025 (Year: 2020).*

(Continued)

*Primary Examiner* — Rocio Del Mar Perez-Velez
*Assistant Examiner* — Julian S Mendel
(74) *Attorney, Agent, or Firm* — Greenberg Traurig, LLP

(57) ABSTRACT

The disclosed computer-implemented method can include detecting, by at least one processor, a cache load from a second central processing unit (CPU) cache hierarchy onto an exclusively owned cache region of cache memory that is exclusively owned by a first CPU cache hierarchy. The method can additionally include converting, by the at least one processor, the exclusively owned cache region, in response to the detection, to a dual owner cache region at least in part by partitioning one or more fields of an entry for the dual owner cache region in a region-based probe filter. The method can also include employing, by the at least one processor, the entry for the dual owner cache region to track cache subregion subscriptions of both the first CPU cache hierarchy and the second CPU cache hierarchy. Various other methods, systems, and computer-readable media are also disclosed.

20 Claims, 8 Drawing Sheets

(56) References Cited

U.S. PATENT DOCUMENTS

| | | | |
|---|---|---|---|
| 2010/0180084 A1* | 7/2010 | Cypher | G06F 12/084 |
| | | | 711/135 |
| 2010/0268884 A1 | 10/2010 | Cummings et al. | |
| 2011/0078492 A1* | 3/2011 | Kumar | G06F 12/0817 |
| | | | 711/146 |
| 2013/0097385 A1* | 4/2013 | Beckmann | G06F 12/0817 |
| | | | 711/128 |
| 2017/0286299 A1* | 10/2017 | Sury | G06F 12/0811 |
| 2018/0004663 A1* | 1/2018 | Jalal | G06F 12/0811 |
| 2019/0050333 A1 | 2/2019 | Chacon et al. | |
| 2019/0188137 A1* | 6/2019 | Kalyanasundharam | |
| | | | G06F 12/0817 |
| 2020/0081844 A1 | 3/2020 | Kalyanasundharam et al. | |
| 2022/0308999 A1* | 9/2022 | Randall | G06F 12/0831 |
| 2023/0139212 A1* | 5/2023 | Randall | G06F 12/0833 |
| | | | 711/118 |

OTHER PUBLICATIONS

U.S Office Action dated Nov. 21, 2024, from related U.S. Appl. No. 17/992,609.

* cited by examiner

| Region-Based Probe Filter(s) 500 ||||| 
|---|---|---|---|---|
| State 502 | Sector Valid 504 | Cluster Valid 506 | Reference Count 508 | Tag 510 |
| ▪ ▪ ▪ | ▪ ▪ ▪ | ▪ ▪ ▪ | ▪ ▪ ▪ | ▪ ▪ ▪ |

*FIG. 5*

SYSTEMS AND METHODS FOR FACILITATING DUAL OWNERSHIP OF CACHE REGIONS

BACKGROUND

Cache regions that transition to a shared state typically cannot switch back to an exclusively owned state. Cache regions in a shared state require use of multicast probes, which are not desirable because they require allocation of one or more supporting line-based probe filter entries that consume additional memory and computational resources. Thus, when a subscriber migrates from one central processing unit (CPU) cache hierarchy to another, the cache region from which it moved typically cannot transition back to an exclusive state even if only one subscriber is utilizing that cache region.

BRIEF DESCRIPTION OF THE DRAWINGS

The accompanying drawings illustrate a number of example implementations and are a part of the specification. Together with the following description, these drawings demonstrate and explain various principles of the present disclosure.

FIG. 5 is a graphical illustration of a region-based probe filter for facilitating dual ownership of cache regions.

Figure 1:
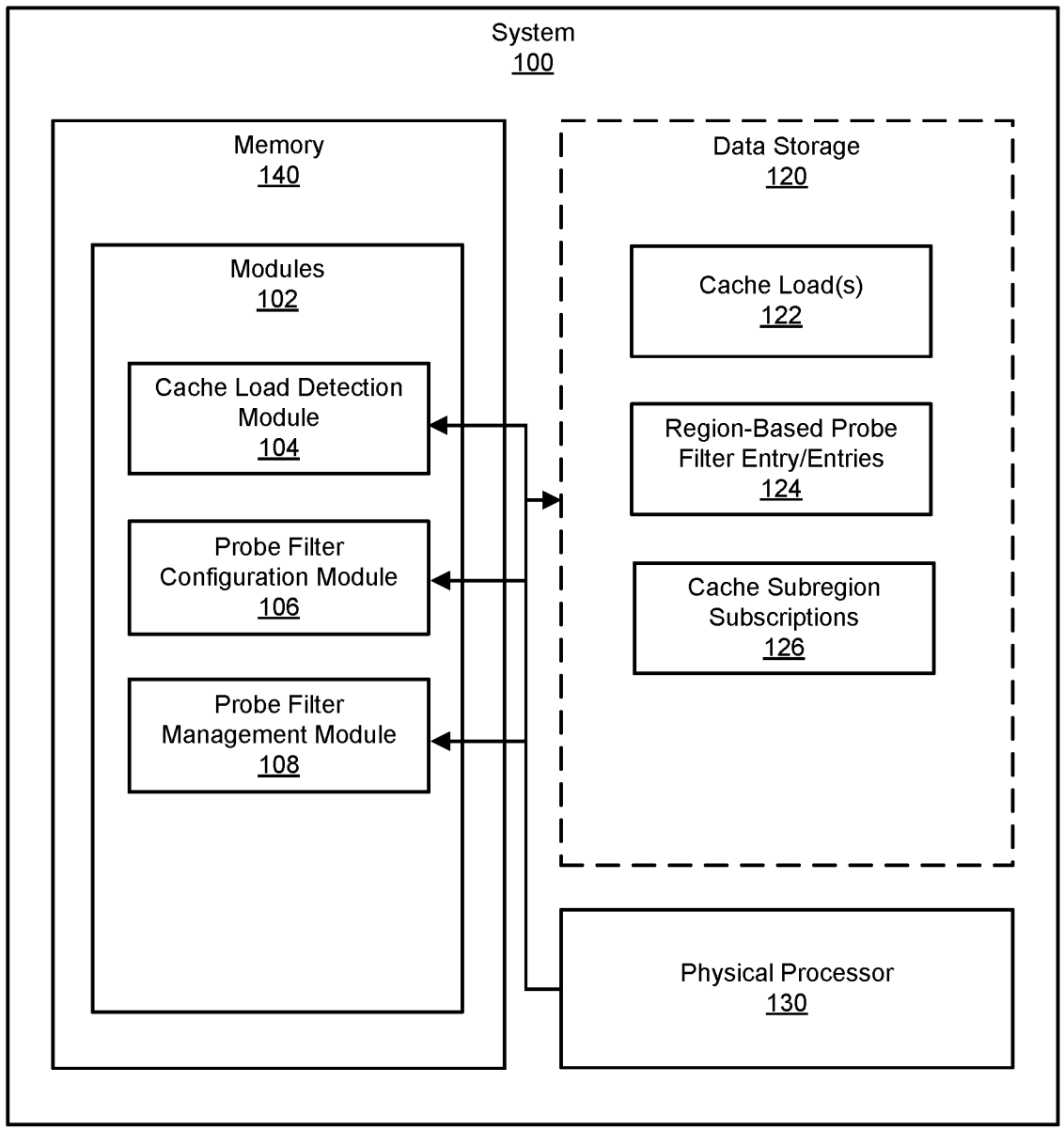
FIG. 1 is a block diagram of an example system for facilitating dual ownership of cache regions.

Throughout the drawings, identical reference characters and descriptions indicate similar, but not necessarily identical, elements. While the example implementations described herein are susceptible to various modifications and alternative forms, specific implementations have been shown by way of example in the drawings and will be described in detail herein. However, the example implementations described herein are not intended to be limited to the particular forms disclosed. Rather, the present disclosure covers all modifications, equivalents, and alternatives falling within the scope of the appended claims.

DETAILED DESCRIPTION OF EXAMPLE IMPLEMENTATIONS

The present disclosure is generally directed to systems and methods for facilitating dual ownership of cache regions. When a second owner makes a subscription for a region-based probe filter entry that is exclusively owned, the entry can transition to a shared state for which supporting line-based probe filter entries are allocated. The supporting line-based probe filter entries are a limited resource and should be used judiciously. The shared region entry cannot transition back to an exclusive region because other fields, like tracker and sector valid bits, are aliased between multiple owners. The disclosed systems and methods address this issue by avoiding transitioning an exclusive entry to a shared entry if there are only two subscribers to the cache region.

According to the disclosed systems and methods, a region-based probe filter entry for a CPU cache hierarchy can be partitioned as needed to accommodate two owners, without transitioning the entry to a shared cache region. For example, on a first cache load from a second CPU cache hierarchy onto an exclusively owned cache region, the entry for the exclusively owned cache region can be partitioned to accommodate two owners, with no supporting line-based probe filter entries being allocated while the entry is in the dual owner state. In some examples, if a third CPU cache hierarchy requests a line in the dual owner cache region, then the entry can transition to a shared cache region for which supporting line-based probe filter entries are allocated. In some examples, if one or more reference counts for one of the dual owners exhibit a falling trend, that owner can be invalidated, thus reducing the one or more reference counts for that owner to zero. In some examples, the dual owner cache region can transition back to an exclusively owned cache region when one or more reference counts for one of the dual owners are reduced to zero.

In one example, a computing device includes cache load detection circuitry configured to detect a cache load from a second central processing unit (CPU) cache hierarchy onto an exclusively owned cache region of cache memory that is exclusively owned by a first CPU cache hierarchy, probe filter configuration circuitry responsive to the cache load detection circuitry and configured to convert the exclusively owned cache region to a dual owner cache region at least in part by partitioning one or more fields of an entry for the dual owner cache region in a region-based probe filter, and probe filter management circuitry configured to employ the entry for the dual owner cache region to track cache subregion subscriptions of both the first CPU cache hierarchy and the second CPU cache hierarchy.

Another example can be the previously described computing device, wherein the cache load detection circuitry is further configured to detect another cache load from a third CPU cache hierarchy onto the dual owner cache region, and the probe filter configuration circuitry is further configured to convert the dual owner cache region to a shared cache region at least in part by converting the entry for the shared cache region to a shared entry and allocating one or more supporting line-based probe filter entries for the shared entry.

Another example can be the computing device of any of the previously described computing devices, wherein the probe filter configuration circuitry is further configured to refrain from allocating supporting line probe filters for the entry before it is converted to the shared entry.

Another example can be the computing device of any of the previously described computing devices, wherein the probe filter configuration circuitry is further configured to convert the dual owner cache region back to the exclusively owned cache region in response to observance of one or more reference counts for one of the first CPU cache hierarchy or the second CPU cache hierarchy falling below a threshold.

Another example can be the computing device of any of the previously described computing devices, wherein the probe filter management circuitry is further configured to reduce the one or more reference counts below the threshold in response to observance of a falling trend in the one or more reference counts.

Another example can be the computing device of any of the previously described computing devices, wherein the one or more fields include a cluster valid field that is partitioned to track two unique owner identities.

Another example can be the computing device of any of the previously described computing devices, wherein the one or more fields include a sector valid field and a reference count field that are each partitioned into two groups that track the cache subregion subscriptions of both the first CPU cache hierarchy and the second CPU cache hierarchy.

In one example, a system can include at least one physical processor and a physical memory comprising computer-executable instructions that, when executed by the physical processor, cause the physical processor to detect a cache load from a second central processing unit (CPU) cache hierarchy onto an exclusively owned cache region of cache memory that is exclusively owned by a first CPU cache hierarchy, convert the exclusively owned cache region, in response to the detection, to a dual owner cache region at least in part by partitioning one or more fields of an entry for the dual owner cache region in a region-based probe filter, and employ the entry for the dual owner cache region to track cache subregion subscriptions of both the first CPU cache hierarchy and the second CPU cache hierarchy.

Another example can be the system of the previously described example system, wherein the instructions further cause the physical processor to detect another cache load from a third CPU cache hierarchy onto the dual owner cache region and convert the dual owner cache region to a shared cache region at least in part by converting the entry for the shared cache region to a shared entry and allocating one or more supporting line-based probe filter entries for the shared entry.

Another example can be the system of any of the previously described example systems, wherein the instructions further cause the physical processor to refrain from allocating supporting line probe filters for the entry before it is converted to the shared entry.

Another example can be the system of any of the previously described example systems, wherein the instructions further cause the physical processor to convert the dual owner cache region back to the exclusively owned cache region in response to observance of one or more reference counts for one of the first CPU cache hierarchy or the second CPU cache hierarchy falling below a threshold.

Another example can be the system of any of the previously described example systems, wherein the instructions further cause the physical processor to reduce the one or more reference counts below the threshold in response to observance of a falling trend in the one or more reference counts.

Another example can be the system of any of the previously described example systems, wherein the one or more fields include a cluster valid field that is partitioned to track two unique owner identities.

Another example can be the system of any of the previously described example systems, wherein the one or more fields include a sector valid field and a reference count field that are each partitioned into two groups that track the cache subregion subscriptions of both the first CPU cache hierarchy and the second CPU cache hierarchy.

In one example, a computer-implemented method can include detecting, by at least one processor, a cache load from a second central processing unit (CPU) cache hierarchy onto an exclusively owned cache region of cache memory that is exclusively owned by a first CPU cache hierarchy, converting, by the at least one processor, the exclusively owned cache region, in response to the detection, to a dual owner cache region at least in part by partitioning one or more fields of an entry for the dual owner cache region in a region-based probe filter, and employing, by the at least one processor, the entry for the dual owner cache region to track cache subregion subscriptions of both the first CPU cache hierarchy and the second CPU cache hierarchy.

In another example, the method of the previously described example method can further include detecting another cache load from a third CPU cache hierarchy onto the dual owner cache region and converting the dual owner cache region to a shared cache region at least in part by converting the entry for the shared cache region to a shared entry and allocating one or more supporting line-based probe filter entries for the shared entry.

Another example can be the method of any of the previously described example methods, further including refraining from allocating supporting line probe filters for the entry before it is converted to the shared entry.

Another example can be the method of any of the previously described example methods, further including converting the dual owner cache region back to the exclusively owned cache region in response to observance of one or more reference counts for one of the first CPU cache hierarchy or the second CPU cache hierarchy falling below a threshold.

Another example can be the method of any of the previously described example methods, further including reducing the one or more reference counts below the threshold in response to observance of a falling trend in the one or more reference counts.

Another example can be the method of any of the previously described example methods, wherein the one or more fields include a cluster valid field that is partitioned to track two unique owner identities, and a sector valid field and a reference count field that are each partitioned into two groups that track the cache subregion subscriptions of both the first CPU cache hierarchy and the second CPU cache hierarchy.

Figure 2:
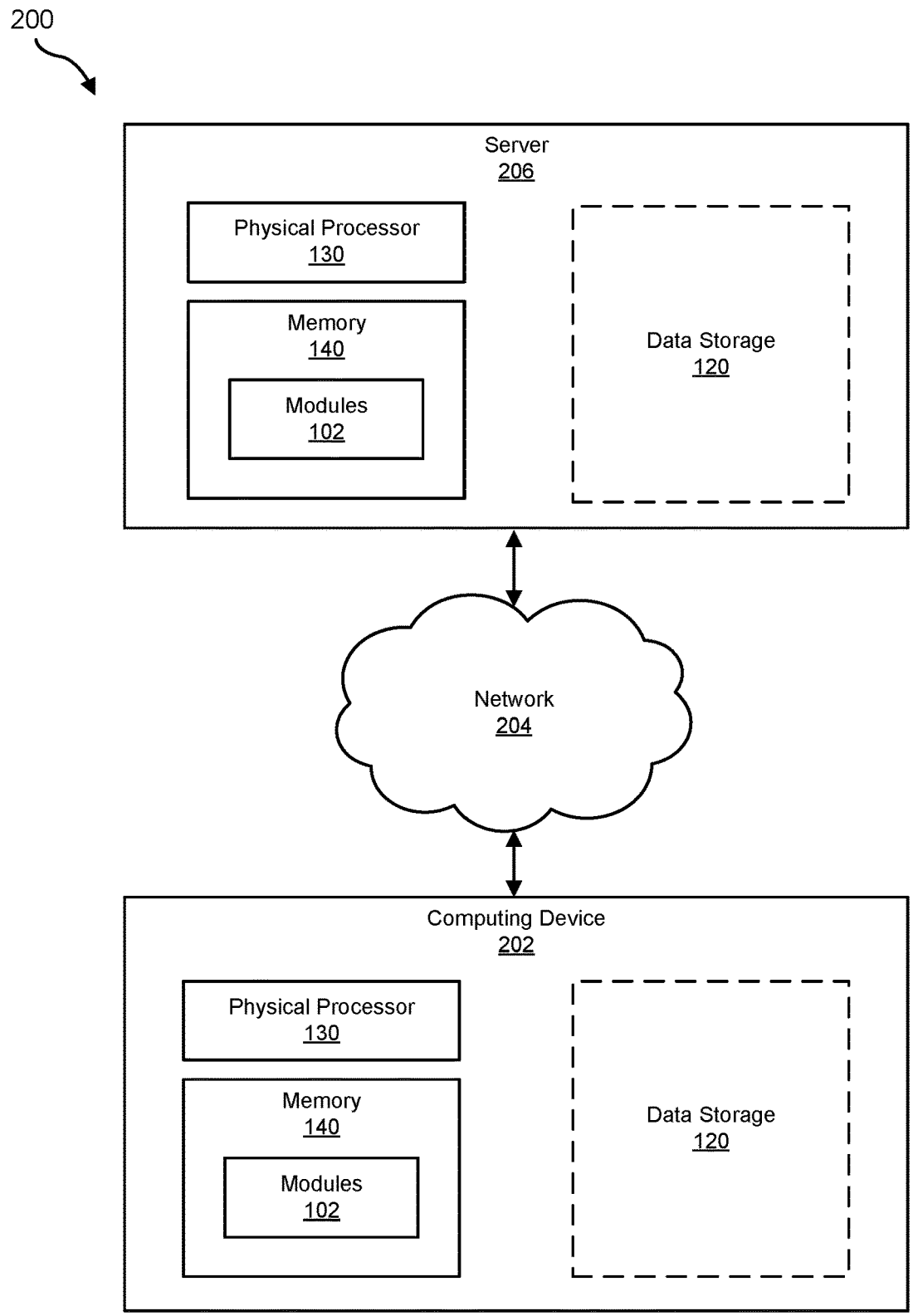
FIG. 2 is a block diagram of an additional example system for facilitating dual ownership of cache regions.

The following will provide, with reference to FIGS. 1-2, detailed descriptions of example systems for facilitating dual ownership of cache regions. Detailed descriptions of corresponding computer-implemented methods will also be provided in connection with FIG. 3. In addition, detailed descriptions of example probe filters and entries will be provided in connection with FIGS. 4-8.

FIG. 1 is a block diagram of an example system 100 for facilitating dual ownership of cache regions. As illustrated in this figure, example system 100 can include one or more modules 102 for performing one or more tasks. As will be explained in greater detail below, modules 102 can include a cache load detection module 104, a probe filter configuration module 106, and a probe filter management module 108. Although illustrated as separate elements, one or more of modules 102 in FIG. 1 can represent portions of a single module or application.

In certain implementations, one or more of modules 102 in FIG. 1 can represent one or more software applications or programs that, when executed by a computing device, can cause the computing device to perform one or more tasks. For example, and as will be described in greater detail below, one or more of modules 102 can represent modules stored and configured to run on one or more computing devices, such as the devices illustrated in FIG. 2 (e.g., computing device 202 and/or server 206). One or more of modules 102 in FIG. 1 can also represent all or portions of one or more special-purpose computers configured to perform one or more tasks.

As illustrated in FIG. 1, example system 100 can also include one or more memory devices, such as memory 140. Memory 140 generally represents any type or form of volatile or non-volatile storage device or medium capable of storing data and/or computer-readable instructions. In one example, memory 140 can store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 can also include one or more physical processors, such as physical processor 130. Physical processor 130 generally represents any type or form of hardware-implemented processing unit capable of interpreting and/or executing computer-readable instructions. In one example, physical processor 130 can access and/or modify one or more of modules 102 stored in memory 140. Additionally or alternatively, physical processor 130 can execute one or more of modules 102 to facilitate dual ownership of cache regions. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 can also include one or more instances of stored data, such as data storage 120. Data storage 120 generally represents any type or form of stored data, however stored (e.g., signal line transmissions, bit registers, flip flops, software in rewritable memory, configurable hardware states, combinations thereof, etc.). In one example, data storage 120 includes databases, spreadsheets, tables, lists, matrices, trees, or any other type of data structure. Examples of data storage 120 include, without limitation, cache load(s) 122, region-based probe filter entry/entries 124, and cache subregion subscriptions 126.

Example system 100 in FIG. 1 can be implemented in a variety of ways. For example, all or a portion of example system 100 can represent portions of example system 200 in FIG. 2. As shown in FIG. 2, system 200 can include a computing device 202 in communication with a server 206 via a network 204. In one example, all or a portion of the functionality of modules 102 can be performed by computing device 202, server 206, and/or any other suitable computing system. As will be described in greater detail below, one or more of modules 102 from FIG. 1 can, when executed by at least one processor of computing device 202 and/or server 206, enable computing device 202 and/or server 206 to facilitate dual ownership of cache regions.

Computing device 202 generally represents any type or form of computing device capable of reading computer-executable instructions. In some implementations, computing device 202 can be and/or include a cache subsystem and/or a controller of a cache directory (i.e., probe filter). Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Server 206 generally represents any type or form of computing device that is capable of reading computer-executable instructions. In some implementations, computing device 202 can be and/or include a cache subsystem and/or a controller of a cache directory (i.e., probe filter). Additional examples of server 206 include, without limitation, storage servers, database servers, application servers, and/or web servers configured to run certain software applications and/or provide various storage, database, and/or web services. Although illustrated as a single entity in FIG. 2, server 206 can include and/or represent a plurality of servers that work and/or operate in conjunction with one another.

Network 204 generally represents any medium or architecture capable of facilitating communication or data transfer. In one example, network 204 can facilitate communication between computing device 202 and server 206. In this example, network 204 can facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems can be connected to system 100 in FIG. 1 and/or system 200 in FIG. 2. Conversely, all of the components and devices illustrated in FIGS. 1 and 2 need not be present to practice the implementations described and/or illustrated herein. The devices and subsystems referenced above can also be interconnected in different ways from that shown in FIG. 2. Systems 100 and 200 can also employ any number of software, firmware, and/or hardware configurations. For example, one or more of the example implementations disclosed herein can be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The term "computer-implemented," as used herein, generally refers to hardware, software, or any combination thereof. For example, and without limitation, computer-implemented can refer to specific hardware logic configured to facilitate dual ownership of cache regions. Alternatively, computer-implemented can refer to software configured to facilitate dual ownership of cache regions. Alternatively, computer-implemented can refer to a general-purpose processor in combination with software that configures the general-purpose processor to facilitate dual ownership of cache regions. Alternatively, computer-implemented can refer to a combination of a general-purpose processor, software, and specific hardware logic configured to facilitate dual ownership of cache regions.

The terms "processor" and "physical processor," as used herein, generally refer to any circuitry capable of detecting and tracking invalidation. For example, and without limitation, processor and physical processor can refer to specific hardware logic configured to detect and track invalidation, a combination of a general-purpose processor that enacts machine-readable instructions, or combinations thereof.

Figure 3:
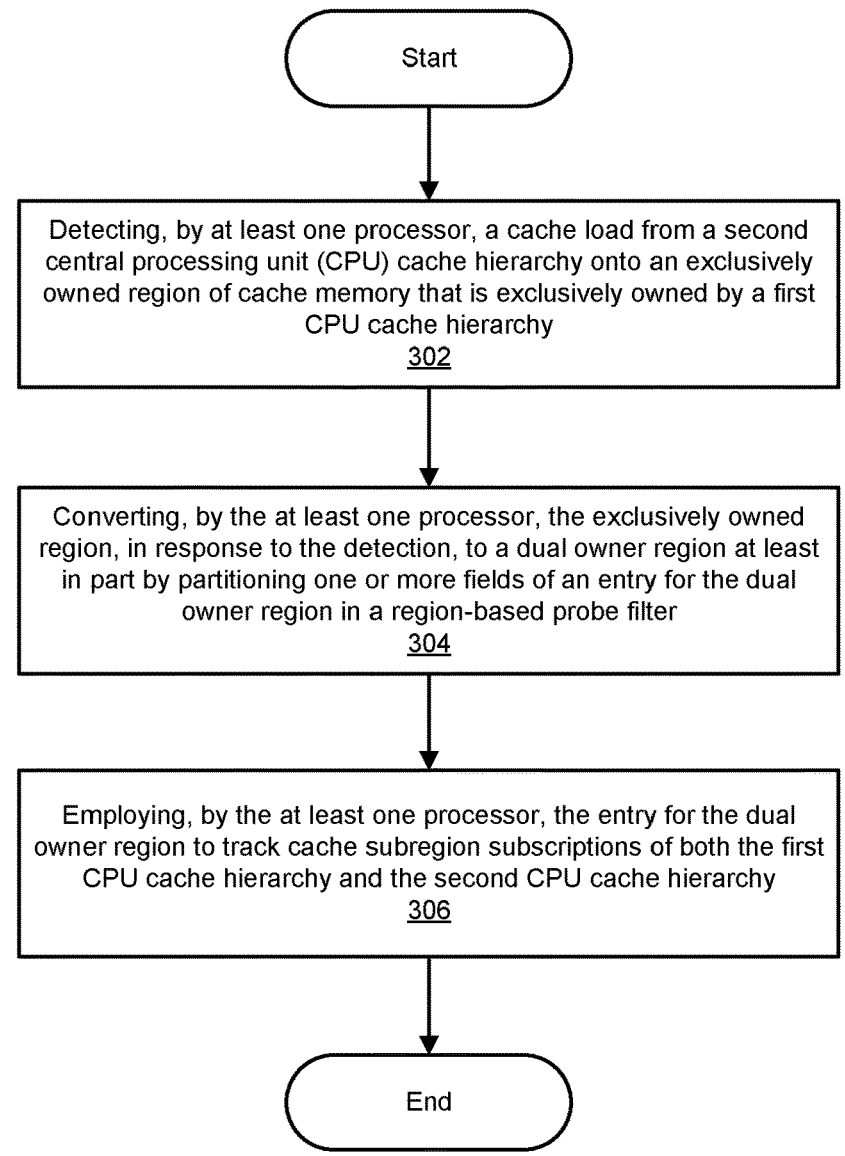
FIG. 3 is a flow diagram of an example method for facilitating dual ownership of cache regions.

FIG. 3 is a flow diagram of an example computer-implemented method 300 for facilitating dual ownership of cache regions. The steps shown in FIG. 3 can be performed by any suitable computer-executable code and/or computing system, including system 100 in FIG. 1, system 200 in FIG. 2, and/or variations or combinations of one or more of the same. In one example, each of the steps shown in FIG. 3 can represent an algorithm whose structure includes and/or is represented by multiple sub-steps, examples of which will be provided in greater detail below.

As illustrated in FIG. 3, at step 302 one or more of the systems described herein can detect one or more cache loads. For example, cache load detection module 104 can, as part of computing device 202 in FIG. 2, detect a cache load from a second central processing unit (CPU) cache hierarchy onto an exclusively owned cache region of cache memory that is exclusively owned by a first CPU cache hierarchy.

The term "cache memory," as used herein, can generally refer to hardware and/or software that is used to store something, usually data, temporarily in a computing environment. For example, and without limitation, a cache memory can be fast access hardware such as random-access memory (RAM) and can also be used in correlation with a software component. A cache memory can be implemented to increase data retrieval performance by reducing the need to access an underlying slower storage layer.

The term "cache load," as used herein, can generally refer to a request to allocate a line of cache memory in order to load data onto the cache line. Examples of cache loads include, without limitation, accesses (e.g., read accesses and/or write accesses), write allocations, write arounds, write backs, write throughs, and probe requests.

The term "CPU cache hierarchy," as used herein, can generally refer to a memory architecture that uses a hierarchy of memory stores based on varying access speeds to cache data. Examples of CPU cache hierarchies include L1 (Level 1) cache that is the fastest memory that is present in a computer system, L2 (Level 2) cache that is slower than the L1 cache but larger in size, and L3 (Level 3) cache that is the largest but also the slowest cache memory unit.

The term "cache region," as used herein, can generally refer to part of the cache that is given a name. Example cache regions can include, without limitation, a group of two or more cache lines, a cache sector, a group of two or more cache sectors, etc.

The systems described herein can perform step 302 in a variety of ways. In some examples, cache load detection module 104, as part of computing device 202 in FIG. 2, can detect another cache load from a third CPU cache hierarchy onto the dual owner cache region.

At step 304 one or more of the systems described herein can configure one or more probe filters. For example, probe filter configuration module 106 can, as part of computing device 202 in FIG. 2, respond to the cache load detection circuitry by converting the exclusively owned cache region to a dual owner cache region at least in part by partitioning one or more fields of an entry for the dual owner cache region in a region-based probe filter.

The term "probe filter," as used herein, can generally refer to a cache directory that records where data is stored in cache memory. Example probe filters can include, without limitation, a controller in combination with a region-based probe filter and one or more sets of line-based probe filter entries. When a probe request is received, the probe filter can avoid a probe of the cache if it records that a line indicated by the probe request already stores data.

The term "partition," as used herein, can generally refer to the action or state of dividing or being divided into parts. Example partitions include, without limitation, dividing a cache region into two or more cache subregions, dividing a cluster valid field into two or more groups, dividing a sector valid field into two or more groups, and/or dividing a reference count field into two or more groups.

The systems described herein can perform step 304 in a variety of ways. In some examples, probe filter configuration module 106, as part of computing device 202 in FIG. 2, can partition one or more fields that include a cluster valid field that is partitioned to track two unique owner identities. Alternatively or additionally, probe filter configuration module 106, as part of computing device 202 in FIG. 2, can partition one or more fields that include a sector valid field and/or a reference count field that are each partitioned into two groups that track the cache subregion subscriptions of both the first CPU cache hierarchy and the second CPU cache hierarchy. In some examples, probe filter configuration module 106, as part of computing device 202 in FIG. 2, can respond to the detection of the other cache load from the third CPU hierarchy by converting the dual owner cache region to a shared cache region at least in part by converting the entry for the shared cache region to a shared entry and allocating supporting line-based probe filter entries for the shared entry. In some examples, probe filter configuration module 106, as part of computing device 202 in FIG. 2, can refrain from allocating supporting line probe filters for the entry before it is converted to the shared entry. In some examples, probe filter configuration module 106, as part of computing device 202 in FIG. 2, can convert the dual owner cache region back to the exclusively owned cache region in response to observance of one or more reference counts for one of the first CPU cache hierarchy or the second CPU cache hierarchy falling below a threshold (e.g., falls to zero).

At step 306 one or more of the systems described herein can manage one or more probe filters. For example, probe filter management module 106 can, as part of computing device 202 in FIG. 2, employ the entry for the dual owner cache region to track cache subregion subscriptions of both the first CPU cache hierarchy and the second CPU cache hierarchy.

The term "cache subregion subscription," as used herein, can generally refer to a reservation to utilize a portion of cache memory. for example, and without limitation, examples of cache subregion subscriptions can include bit vectors that track individual CPUs of cache hierarchies, bit vectors corresponding to sub-groups or sectors of lines within respective cache subregions, one or more reference counts that track numbers of cache lines of respective cache subregions that are cached somewhere in the system, combinations thereof, etc.

The systems described herein can perform step 304 in a variety of ways. In some examples, probe filter configuration module 106, as part of computing device 202 in FIG. 2, can reduce the one or more reference counts below the threshold in response to observance of a falling trend in the one or more reference counts. Such a falling trend can correspond to another threshold for the one or more reference counts (e.g., greater than the threshold for transitioning the dual owner cache region back to the exclusively owned cache region), a threshold number of consecutive reductions of the one or more reference counts, a threshold rate of reduction of the one or more reference counts, combinations thereof, etc.

Figure 4:
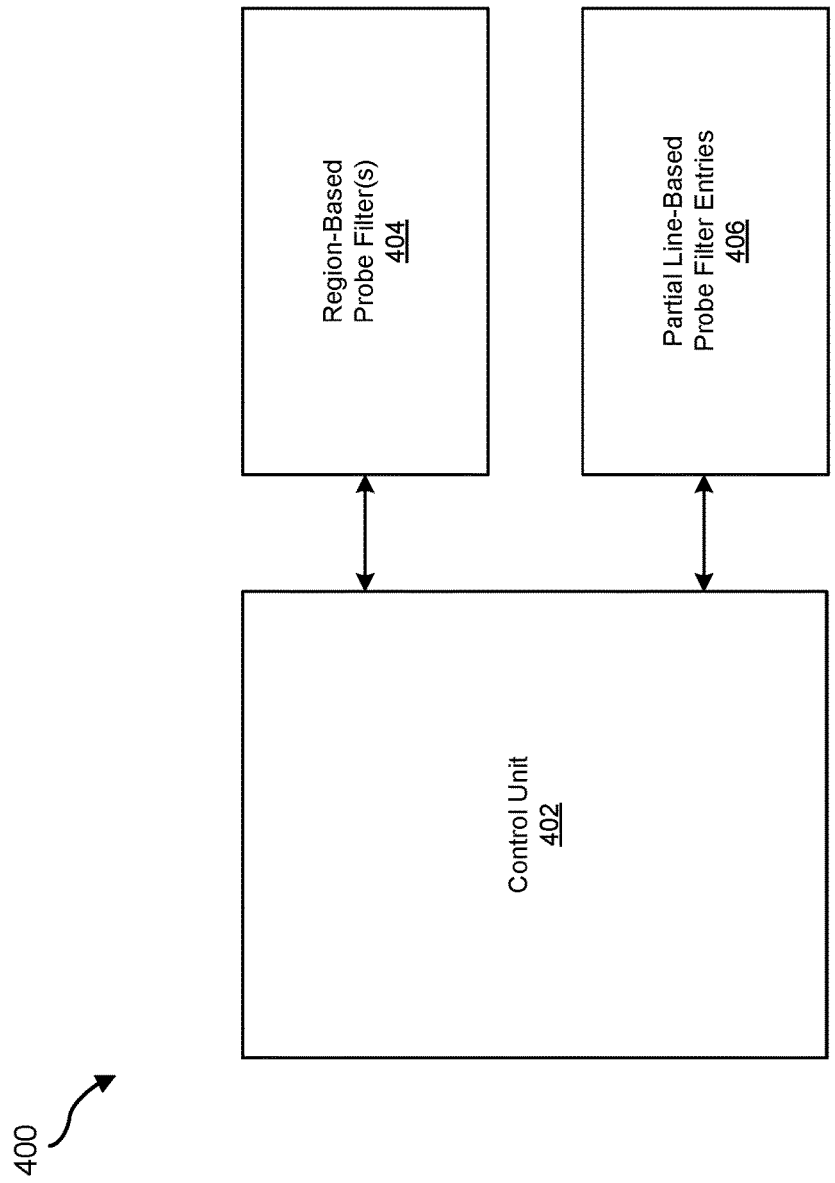
FIG. 4 is a block diagram illustrating an example of a probe filter for facilitating dual ownership of cache regions.

FIG. 4 illustrates an example of a probe filter (i.e., cache directory) for facilitating dual ownership of cache regions. In some implementations, probe filter 400 includes at least control unit 402 coupled to region-based probe filter 404 and partial line-based probe filter entries 406. Region-based probe filter 404 includes entries to track cached data on a region-basis. In some implementations, individual entries of region-based probe filter 404 can include a reference count to count the number of accesses to cache lines of the cache region that are cached by the cache subsystems of the computing system (e.g., system 100 of FIG. 1). In one implementation, when the reference count for a given cache region reaches a threshold, the given cache region will start being tracked on a line-basis by partial line-based probe filter entries 406.

Accordingly, in one implementation, when the number of cache lines that are cached for a given cache region reaches a threshold, partial line-based probe filter entries 406 can start to track the accesses to individual lines of the given cache region. Each time a new cache line is accessed from the given cache region, a new entry is created in partial line-based probe filter entries 406 for the cache line. In some implementations, lookups can be performed in parallel to region-based probe filter 404 and partial line-based probe filter entries 406.

In some implementations, only shared cache regions that have a reference count greater than a threshold are tracked on a cache line-basis by partial line-based probe filter entries 406. A shared cache region refers to a cache region that has cache lines stored in cache subsystems of at least two different CPUs. An exclusive cache region refers to a cache region that has cache lines that are cached by only a single CPU. Accordingly, in some implementations, for shared cache regions that have a reference count greater than a threshold, there will be one or more entries in the partial line-based probe filter entries 406. In such implementations, for exclusive cache regions, there can be no entries in the partial line-based probe filter entries 406.

FIG. 5 is a graphical illustration of a region-based probe filter supported by partial line-based probe filter entries for facilitating dual ownership of cache regions. In some implementations, region-based probe filter 500 can include any number of entries, with the number of entries varying according to the implementation. In some implementations, individual entries of region-based probe filter 500 can include a state field 502, sector valid field 504, cluster valid field 506, reference count field 508, and tag field 510. In other implementations, the entries of region-based probe filter 500 can include other fields and/or can be arranged in other suitable manners.

The state field 502 can include state bits that specify the aggregate state of the cache region. The aggregate state is a reflection of the most restrictive cache line state for this particular cache region. For example, the state for a given cache region is stored as "dirty" even if only a single cache line for the entire given cache region is dirty. Also, the state for a given cache region is stored as "shared" even if only a single cache line of the entire given cache region is shared.

The sector valid field 504 can store a bit vector corresponding to sub-groups or sectors of lines within the cache region to provide fine grained tracking. By tracking sub-groups of lines within the cache region, the number of unwanted regular coherency probes and individual line probes generated while unrolling a region invalidation probe can be reduced. As used herein, a "region invalidation probe" is defined as a probe generated by the cache directory in response to a cache region entry being evicted from the cache directory. When a coherent master receives a cache region invalidation probe, the coherent master can invalidate each cache line of the cache region that is cached by the local CPU. Additionally, tracker and sector valid bits can be included in the region invalidation probes to reduce probe amplification at the CPU caches.

The organization of sub-groups and the number of bits in sector valid field 504 can vary according to various implementations. In some implementations, two lines can be tracked within a particular cache region entry using sector valid field 504. In other implementations, other numbers of lines can be tracked within each cache region entry. In some implementations, sector valid field 504 can be used to indicate the number of partitions that are being individually tracked within the cache region. Additionally, the partitions can be identified using offsets which are stored in sector valid field 504. Each offset can identify the location of the given partition within the given cache region. Sector valid field 504, or another field of the entry, can also indicate separate owners and separate states for each partition within the given cache region.

The cluster valid field 506 can include a bit vector to track the presence of the cache region across various CPU cache clusters. For example, in some implementations, CPUs can be grouped together into clusters of CPUs. The bit vector stored in cluster valid field 506 can be used to reduce probe destinations for regular coherency probes and region invalidation probes.

The reference count field 508 can be used to track the number of cache lines of the cache region which are cached somewhere in the system. On the first access to a cache region, an entry can be installed in region-based probe filter 500 and the reference count field 508 can be set to one. Over time, each time a cache accesses a cache line from this cache region, the reference count can be incremented. As cache lines from this cache region are evicted by the caches, the reference count can decrement (i.e., be reduced). Eventually, if the reference count reaches zero, the entry can be marked as invalid and the entry can be reused for another cache region. By utilizing the reference count field 508, the incidence of region invalidation probes can be reduced. The reference count field 508 allows directory entries to be reclaimed when an entry is associated with a cache region with no active subscribers. In some implementations, the reference count field 508 can saturate once the reference count crosses a threshold. The threshold can be set to a value large enough to handle exclusive access patterns while sacrificing some accuracy when handling widely shared access patterns for communication data. The tag field 510 can include the tag bits that are used to identify the entry associated with a particular cache region.

Figure 6:
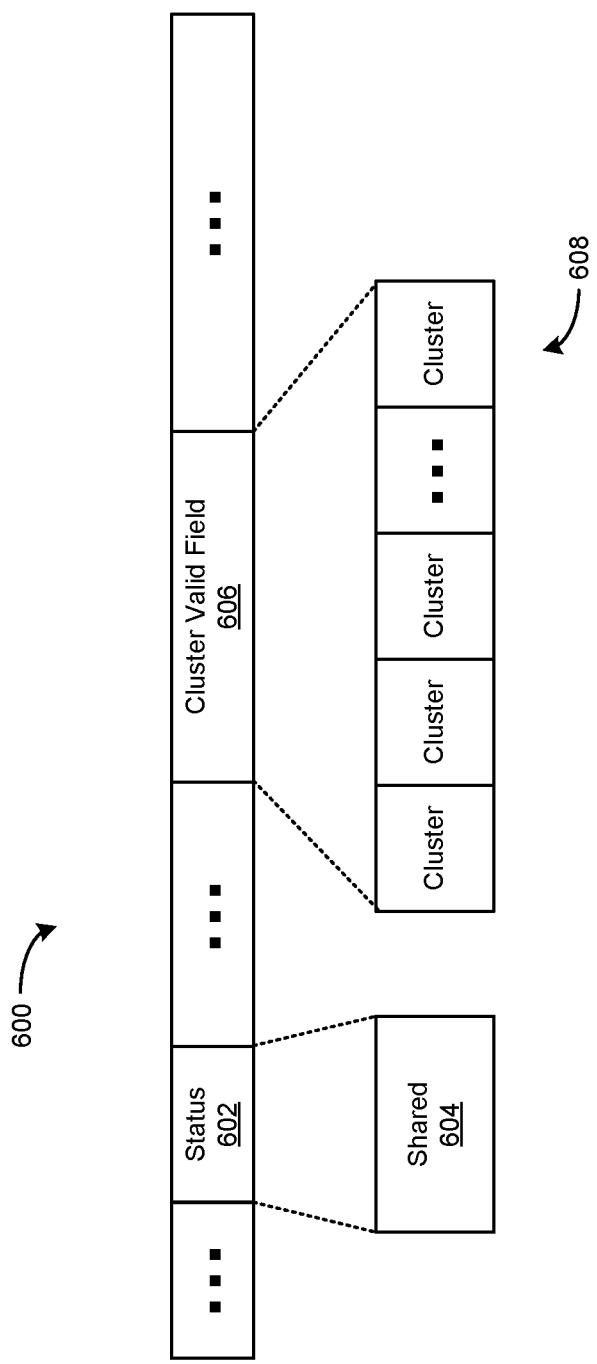
FIG. 6 is a graphical illustration of a shared entry of a region-based probe filter for tracking subscriptions to a shared cache region.

FIG. 6 illustrates a shared entry of a region-based probe filter supported by partial line-based probe filter entries. In some implementations, entry 600 includes various fields associated with a shared cache region being tracked by a cache directory. The status field 602 stores a shared encoding 604 to indicate that the corresponding cache region is shared. As used herein, a "shared" cache region refers to a cache region which has cache lines that are cached by multiple different CPU clusters. When the status field 602 stores a shared encoding 604, the cluster valid field 606 can store a bit vector to indicate which CPU clusters 608 are caching a cache line of the corresponding cache region. In this example, the cluster valid field 606 can group CPUs together into clusters. In some implementations, if a cluster bit is set to one, then this value can indicate that the cluster of CPUs stores at least one cache line from the cache region. Otherwise, if a cluster bit is set to zero, then this value can indicate that none of the CPUs in the cluster stores a cache line from the cache region. Entry 600 can also include any number of other fields which are not shown to avoid obscuring the figure.

Figure 7:
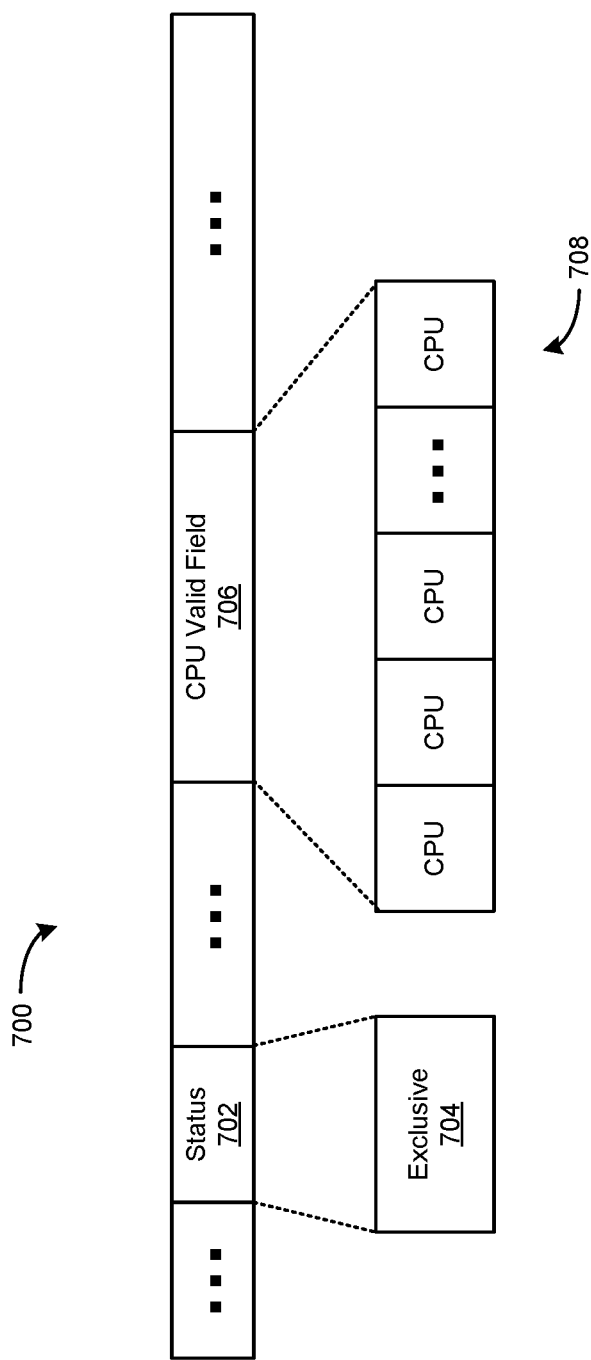
FIG. 7 is a graphical illustration of an exclusive entry of a region-based probe filter for tracking subscriptions to an exclusively owned cache region.

FIG. 7 illustrates a non-shared (e.g., exclusive) entry of a region-based probe filter entry for tracking subscriptions to an exclusively owned cache region. If the cluster valid field 606 (FIG. 6) were utilized for an exclusive cache region in the same way as for a shared cache region, a probe would need to be sent to all of the CPUs in the cluster that is identified as caching at least one cache line of that cache region. Rather, in some implementations, if a cache region is exclusive (i.e., accessed by only a single cluster), then the cluster valid field used for a shared entry can be used as another type of cluster valid field for an exclusive entry. This other type of cluster valid field can be referred to as an owner valid field or CPU valid field. This other type of cluster valid field allows the cache directory to probe one particular CPU for an exclusive cache region.

Accordingly, before the cache region being tracked by entry 600 (FIG. 6) transitions from being an exclusive cache region to being a shared cache region, then the entry 700 represents the difference in fields as compared to entry 600 (FIG. 6) for this exclusive cache region. As shown in entry 700, status 702 includes an exclusive 704 encoding to represent the exclusive status of the region. Since the status 702 is exclusive 704, the cluster valid field 606 (FIG. 6) can function as a CPU valid field 706. Each CPU bit 708 of the bit vector stored in CPU valid field 706 represents a single CPU of the original cluster. If a given CPU of this cluster caches at least one cache line of the corresponding cache region, then the particular CPU bit 708 can be set to one. Otherwise, if a given CPU of the cluster does not cache any cache lines from the cache region, then the corresponding CPU bit 708 can be set to zero.

By using the cluster valid field 606 (FIG. 6) as a CPU valid field 706, a directed probe can be sent out which is targeted to only the CPUs which have a cache line from the cache region. This targeting helps to reduce the number of unnecessary probes generated by the cache directory. In some implementations, if a request targeting the exclusive cache region (corresponding to entry 700) is received from a different cluster, then this exclusive cache region can become a shared cache region. When this happens, the cluster valid field 606 (FIG. 6) can be utilized according to its shared type of operation since the cache region is now shared.

Figure 8:
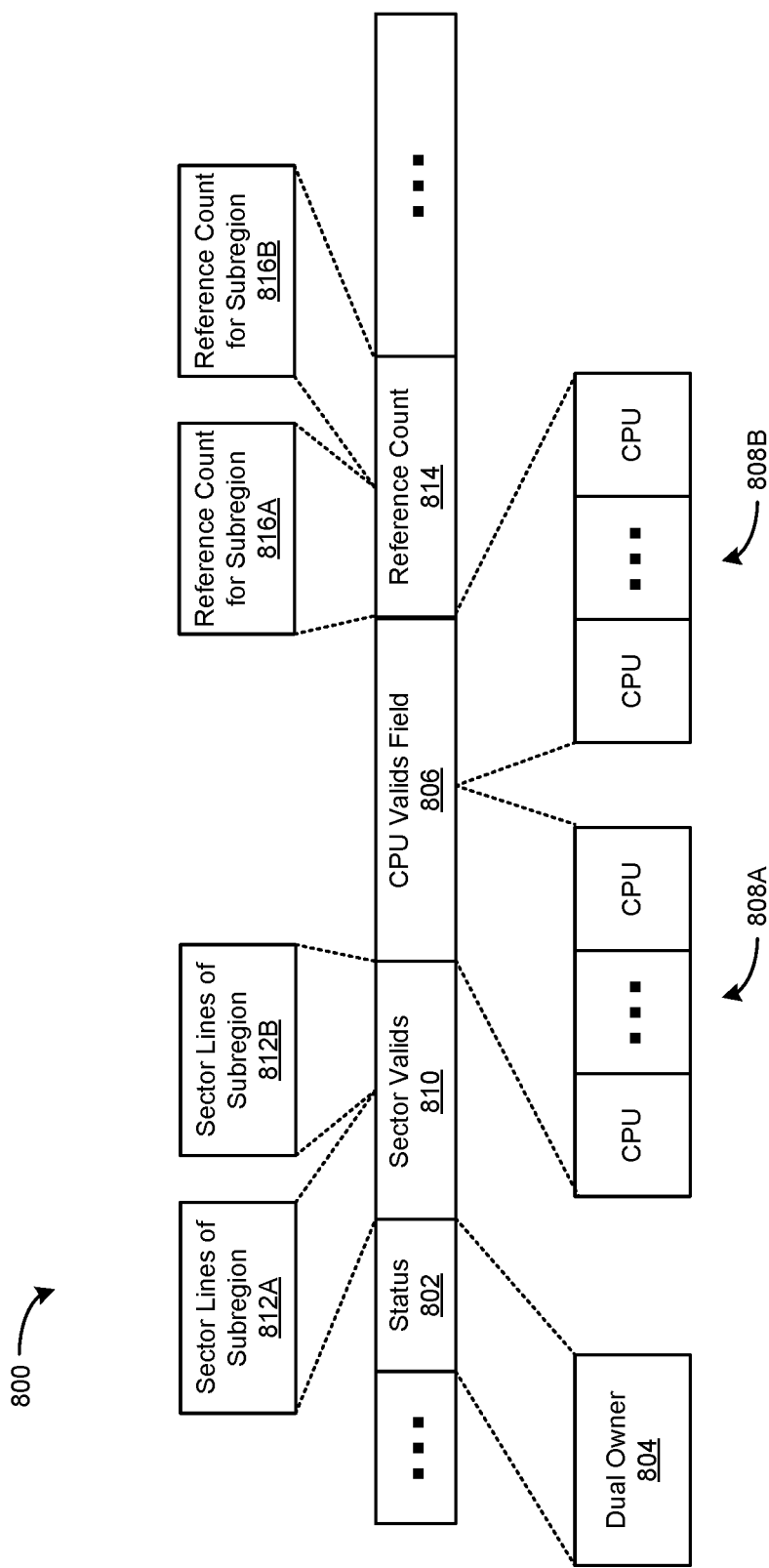
FIG. 8 is a graphical illustration of a dual owner entry of a region-based probe filter for facilitating dual ownership of cache regions.

FIG. 8 illustrates a dual owner entry 800 of a region-based probe filter for facilitating dual ownership of cache regions. When a second owner makes a subscription for region-based probe filter entry that is exclusively owned, the entry can avoid transitioning to a shared state for which supporting line-based probe filter entries are allocated. Avoiding transitioning an entry to a shared entry is advantageous because the supporting line probe filter entries are a limited resource and must be used judiciously. Also, the problem is avoided that a shared region entry cannot transition back to an exclusive region due to other fields, like tracker and sector valid bits, being aliased between multiple owners.

Dual owner entry 800 offers a capability to avoid transitioning an exclusive entry to a shared entry during CPU cache hierarchy migrations that temporarily cause exclusively owned cache regions to have two CPU cache hierarchies subscribing to those cache regions. For example, in response to detecting a first cache load from a second CPU cache hierarchy onto an exclusively owned cache region, the exclusive entry for the exclusively owned cache region can be partitioned to accommodate two owners, with no supporting line probe filters being allocated while the entry is in the dual owner state. In some implementations, status field 802 can be set to dual owner 804 to indicate that one or more other fields of the entry are partitioned, thus enabling proper parsing of those fields during management of dual owner entry 800. For example, CPU valid field 806 can be partitioned to track two unique owner identities. Accordingly, each CPU bit of a bit vector stored in CPU valid field partition 808A can represent a single CPU of a CPU cache hierarchy, and each CPU bit of a bit vector stored in CPU valid field partition 808B can represent a single CPU of another CPU cache hierarchy. This partitioning of CPU valid field 806 enables sending directed probes targeted to only those CPUs which have a cache line from the respective cache subregions of the dual owner cache region.

Additionally or alternatively, sector valid field 810 and/or reference count field 814 can each be partitioned into two groups that track the cache subregion subscriptions of both the first CPU cache hierarchy and the second CPU cache hierarchy. For example, sector valid field partitions 812A and 812B can store bit vectors corresponding to sub-groups and/or sectors of lines within respective cache subregions to provide fine grained tracking. Additionally or alternatively, reference count field partitions 816A and 816B can be used to track numbers of cache lines of respective cache subregions that are cached somewhere in the system. When a reference count for a cache subregion falls below a threshold (e.g., reaches zero), the dual owner entry 800 can transition back to an exclusive entry as described herein with reference to FIG. 7. This ability to transition back to an exclusive entry is possible because the partitioning of the dual owner region entry avoids causing other fields, like tracker and sector valid bits, to be aliased between multiple owners.

In order to avoid unnecessarily transitioning the dual owner entry 800 to a shared entry 600 (FIG. 6) due to migration of a third cache hierarchy into the dual owner cache region while one of the owners is nearly finished migrating out of the dual owner cache region, the reference count for the owner migrating out of the dual owner cache region can be set to zero in response to observance of a falling trend in the reference count for the respective subregion. In some implementations, setting the reference count to zero can further be in response to detecting a first cache load in the dual owner cache region from a third cache hierarchy, thus avoiding unnecessary invalidation of one of the dual owners before it has finished migrating out of the dual owner cache region.

As set forth above, a region-based probe filter entry for a CPU cache hierarchy can be partitioned as needed to accommodate two owners, without transitioning the entry to a shared region. On a first cache load from a second CPU cache hierarchy onto an exclusive region, the entry for the exclusive region can be partitioned to accommodate two owners, with no supporting line probe filters being allocated while the entry is in the dual owner state. In some examples, if a third CPU cache hierarchy requests a line in the dual owner region, then the entry can transition to a shared region for which supporting line probe filters are allocated. In some examples, if one or more reference counts for one of the dual owners exhibit a falling trend, that owner can be invalidated. In some examples, the dual owner region can transition back to an exclusively owned region when the one or more reference counts for one of the dual owners are reduced to zero. The disclosed techniques avoid unnecessarily transitioning an exclusive region to a shared state due to CPU cache hierarchy migration. The disclosed techniques can also allow for recovery of the exclusive state in the region-based probe filter for a region when a subscriber moves from one CPU cache hierarchy to another.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser or other remote interface. Various functions described herein can be provided through a remote desktop environment or any other cloud-based computing environment.

In various implementations, all or a portion of example system 100 in FIG. 1 can facilitate multi-tenancy within a cloud-based computing environment. In other words, the modules described herein can configure a computing system (e.g., a server) to facilitate multi-tenancy for one or more of the functions described herein. For example, one or more of the modules described herein can program a server to enable two or more clients (e.g., customers) to share an application that is running on the server. A server programmed in this manner can share an application, operating system, processing system, and/or storage system among multiple customers (i.e., tenants). One or more of the modules described herein can also partition data and/or configuration information of a multi-tenant application for each customer such that one customer cannot access data and/or configuration information of another customer.

According to various implementations, all or a portion of example system 100 in FIG. 1 can be implemented within a virtual environment. For example, the modules and/or data described herein can reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 can represent portions of a mobile computing environment. Mobile computing environments can be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments can have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein can be provided for a mobile computing environment and/or can interact with a mobile computing environment.

The process parameters and sequence of steps described and/or illustrated herein are given by way of example only and can be varied as desired. For example, while the steps illustrated and/or described herein can be shown or discussed in a particular order, these steps do not necessarily need to be performed in the order illustrated or discussed. The various example methods described and/or illustrated herein can also omit one or more of the steps described or illustrated herein or include additional steps in addition to those disclosed.

While various implementations have been described and/or illustrated herein in the context of fully functional computing systems, one or more of these example implementations can be distributed as a program product in a variety of forms, regardless of the particular type of computer-readable media used to actually carry out the distribution. The implementations disclosed herein can also be implemented using modules that perform certain tasks. These modules can include script, batch, or other executable files that can be stored on a computer-readable storage medium or in a computing system. In some implementations, these modules can configure a computing system to perform one or more of the example Implementations disclosed herein.

The preceding description has been provided to enable others skilled in the art to best utilize various aspects of the example implementations disclosed herein. This example description is not intended to be exhaustive or to be limited to any precise form disclosed. Many modifications and variations are possible without departing from the spirit and scope of the present disclosure. The Implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computing device, comprising:
   circuitry configured to:
      detect a cache load from a second central processing unit (CPU) cache hierarchy for a cache region of memory that is exclusively owned by a first CPU cache hierarchy;
      partition, responsive to detecting the cache load, at least one region of at least a valid field of an entry for the cache region in a probe filter into two or more subregions to track unique owner identities for each
of the two or more subregions; and
employ the entry for the cache region to track usage of
the cache region by both the unique owner identities
of the first CPU cache hierarchy and the second CPU
cache hierarchy.

2. The computing device of claim 1, wherein the circuitry is further configured to:
detect an other cache load from a third CPU cache hierarchy onto the cache region, and
convert the cache region to a shared cache region at least in part by converting the entry for the cache region to a shared entry and allocating one or more supporting line-based probe filter entries for the shared entry.

3. The computing device of claim 2, wherein the circuitry is further configured to refrain from allocating supporting line probe filters for the entry for the cache region before it is converted to the shared entry.

4. The computing device of claim 1, wherein the circuitry is further configured to convert the cache region back to an exclusively owned cache region in response to observance of one or more reference counts for one of the first CPU cache hierarchy or the second CPU cache hierarchy falling below a threshold.

5. The computing device of claim 4, wherein the circuitry is further configured to reduce the one or more reference counts below the threshold in response to observance of a falling trend in the one or more reference counts.

6. The computing device of claim 1, wherein the valid field is partitioned to store a first bit vector in a first region of the two or more subregions that includes bits representing single CPUs of the first CPU cache hierarchy and a second bit vector in a second region of the two or more subregions that includes bits representing single CPUs of the second CPU cache hierarchy.

7. The computing device of claim 1, wherein the circuitry is further configured to partition a sector valid field and a reference count field that are each partitioned into two groups that track the unique owner identities of both the first CPU cache hierarchy and the second CPU cache hierarchy.

8. The computing device of claim 1, wherein the circuitry is further configured to set a status field with the entry for the cache region in the probe filter to indicate that the at least a valid field is partitioned.

9. A system comprising:
at least one physical processor; and
physical memory comprising computer-executable instructions that, when executed by the physical processor, cause the physical processor to:
detect a cache load from a second central processing unit (CPU) cache hierarchy for a cache region of memory that is exclusively owned by a first CPU cache hierarchy;
partition, in response to detecting the cache load, at least one region of at least a valid field of an entry for the cache region in a probe filter into two or more subregions, the partitioned valid field being used to track unique owner identities for each of the two or more subregions; and
employ the entry for the cache region to track usage of the cache region by both the unique owner identities of the first CPU cache hierarchy and the second CPU cache hierarchy.

10. The system of claim 9, wherein the instructions further cause the physical processor to:
detect an other cache load from a third CPU cache hierarchy onto the cache region; and
convert the cache region to a shared cache region at least in part by converting the entry for the cache region to a shared entry and allocating one or more supporting line-based probe filter entries for the shared entry.

11. The system of claim 10, wherein the instructions further cause the physical processor to:
refrain from allocating supporting line probe filters for the entry for the cache region before it is converted to the shared entry.

12. The system of claim 9, wherein the instructions further cause the physical processor to:
convert the cache region back to an exclusively owned cache region in response to observance of one or more reference counts for one of the first CPU cache hierarchy or the second CPU cache hierarchy falling below a threshold.

13. The system of claim 12, wherein the instructions further cause the physical processor to:
reduce the reference counts below the threshold in response to observance of a falling trend in the one or more reference counts.

14. The system of claim 9, wherein the valid field is partitioned to store a first bit vector in a first region of the two or more subregions that includes bits representing single CPUs of the first CPU cache hierarchy and a second bit vector in a second region of the two or more subregions that includes bits representing single CPUs of the second CPU cache hierarchy.

15. The system of claim 9, wherein the instructions further cause the physical processor to include a sector valid field and a reference count field that are each partitioned into two groups that track the unique owner identities of both the first CPU cache hierarchy and the second CPU cache hierarchy.

16. A computer-implemented method, comprising:
detecting, by at least one processor, a cache load from a second central processing unit (CPU) cache hierarchy for a cache region of cache memory that is exclusively owned by a first CPU cache hierarchy;
partitioning, by the at least one processor, in response to detecting the cache load, at least one region of at least a valid field of an entry for the cache region in a probe filter into two or more subregions, the partitioned valid field being used to track unique owner identities for each of the two or more subregions; and
employing, by the at least one processor, the entry for the cache region to track usage of the cache region by both the unique owner identities of the first CPU cache hierarchy and the second CPU cache hierarchy.

17. The method of claim 16, further comprising:
detecting an other cache load from a third CPU cache hierarchy onto the cache region; and
converting the cache region to a shared cache region at least in part by converting the entry for the cache region to a shared entry and allocating one or more supporting line-based probe filter entries for the shared entry.

18. The method of claim 17, further comprising:
refraining from allocating supporting line probe filters for the entry for the cache region before it is converted to the shared entry.

19. The method of claim 16, further comprising:
converting the cache region back to an exclusively owned cache region in response to observance of one or more reference counts for one of the first CPU cache hierarchy or the second CPU cache hierarchy falling below a threshold.

20. The method of claim 16, further comprising:
a sector valid field and a reference count field that are each partitioned into two groups that track the unique owner identities of both the first CPU cache hierarchy and the second CPU cache hierarchy, and
the valid field is partitioned to store a first bit vector in a first region of the two or more subregions that includes bits representing single CPUs of the first CPU cache hierarchy and a second bit vector in a second region of the two or more subregions that includes bits representing single CPUs of the second CPU cache hierarchy.

* * * * *